I. DE FRANCISCI.
MACHINE FOR CONVEYING AND DISTRIBUTING BUTTON BLANKS.
APPLICATION FILED DEC. 11, 1906.

901,893.

Patented Oct. 20, 1908.
5 SHEETS—SHEET 1.

WITNESSES

INVENTOR
Ignazio De Francisci
BY
Sigmund Herzog
his ATTORNEY

I. DE FRANCISCI.
MACHINE FOR CONVEYING AND DISTRIBUTING BUTTON-BLANKS.
APPLICATION FILED DEC. 11, 1906.
901,893.
Patented Oct. 20, 1908.
5 SHEETS—SHEET 2.
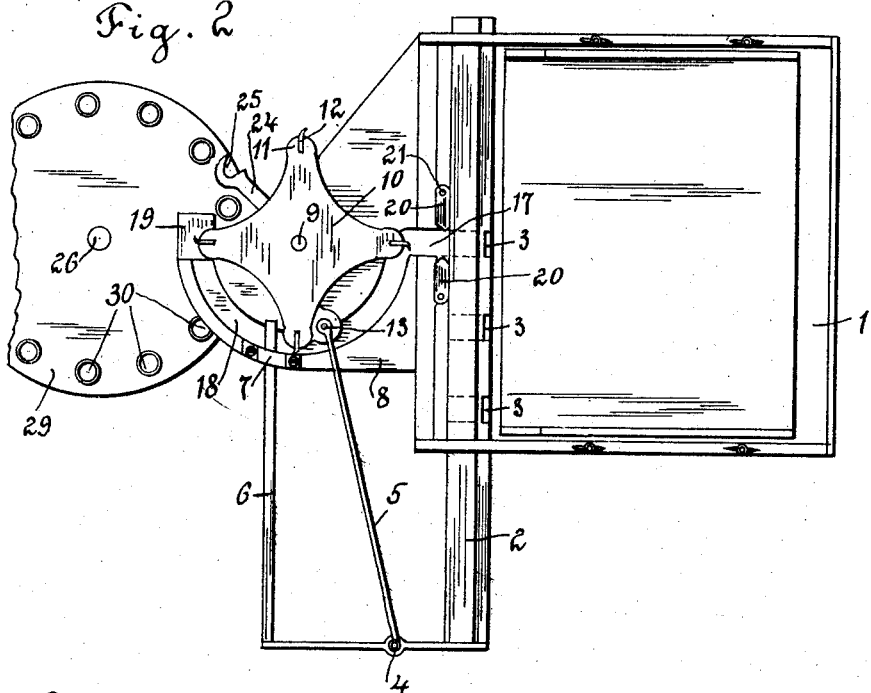
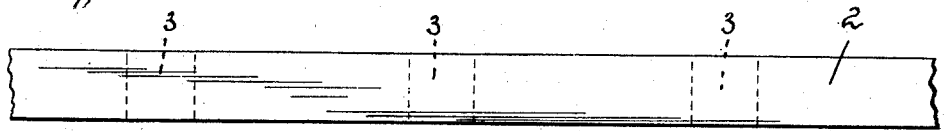
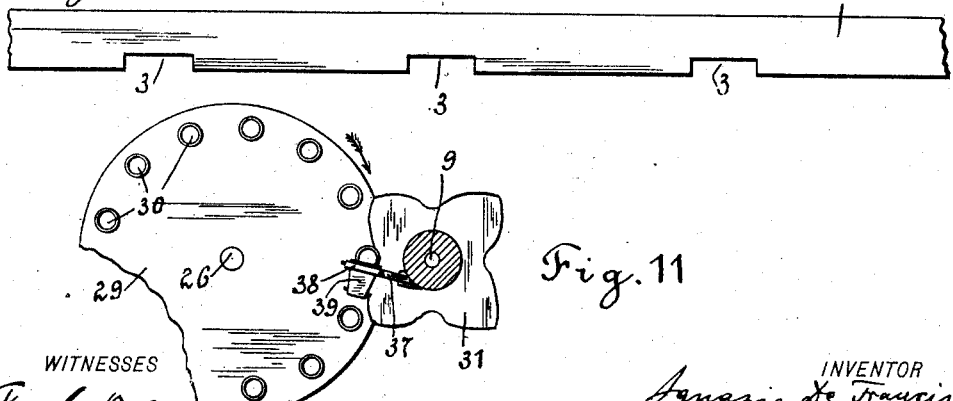
WITNESSES
INVENTOR
BY
ATTORNEY I. DE FRANCISCI.
MACHINE FOR CONVEYING AND DISTRIBUTING BUTTON BLANKS.
APPLICATION FILED DEC. 11, 1906.
901,893.
Patented Oct. 20, 1908.
5 SHEETS—SHEET 3.
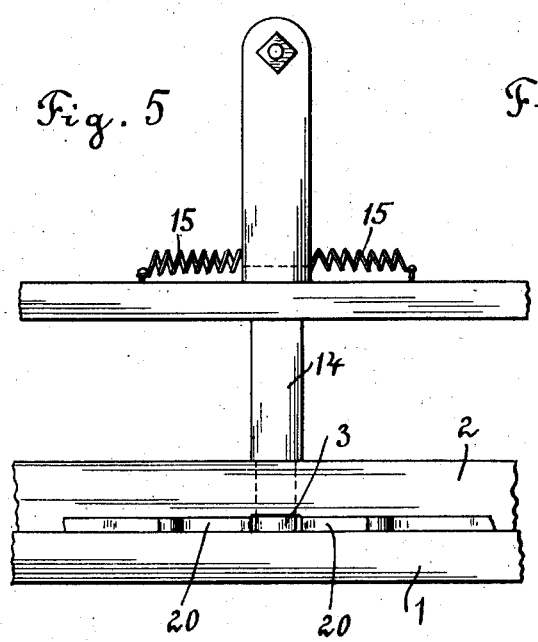
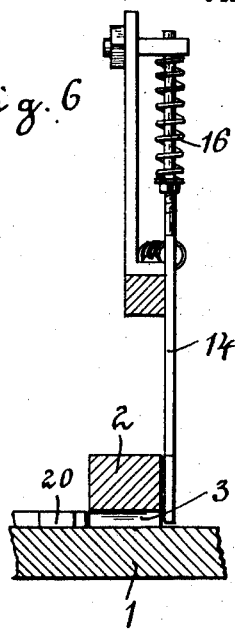
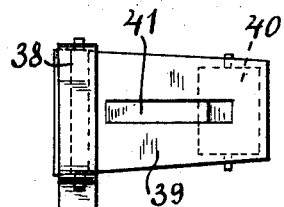
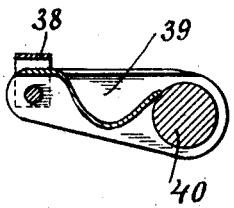
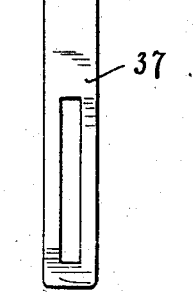
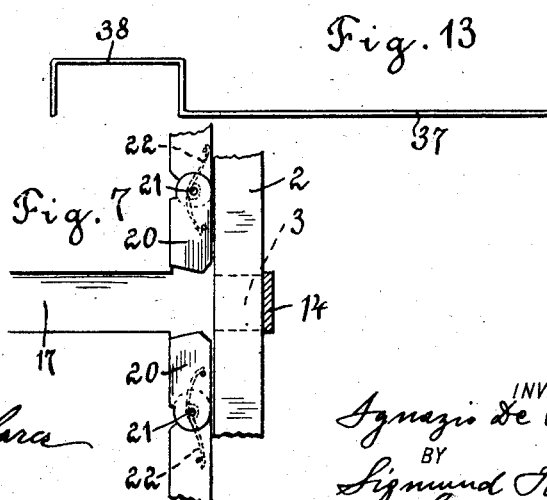
WITNESSES
INVENTOR
Ignazio de Francisci
BY
Sigmund Herzog
his ATTORNEY I. DE FRANCISCI.
MACHINE FOR CONVEYING AND DISTRIBUTING BUTTON BLANKS.
APPLICATION FILED DEC. 11, 1906.

901,893.

Patented Oct. 20, 1908.

5 SHEETS—SHEET 4.

WITNESSES
Frank DeClara
Emanuel Herzog

INVENTOR
Ignazio De Francisci
BY
Sigmund Herzog
his ATTORNEY

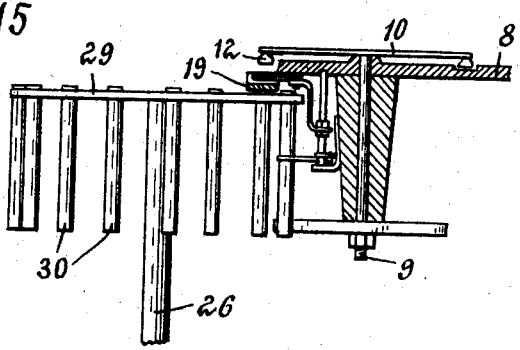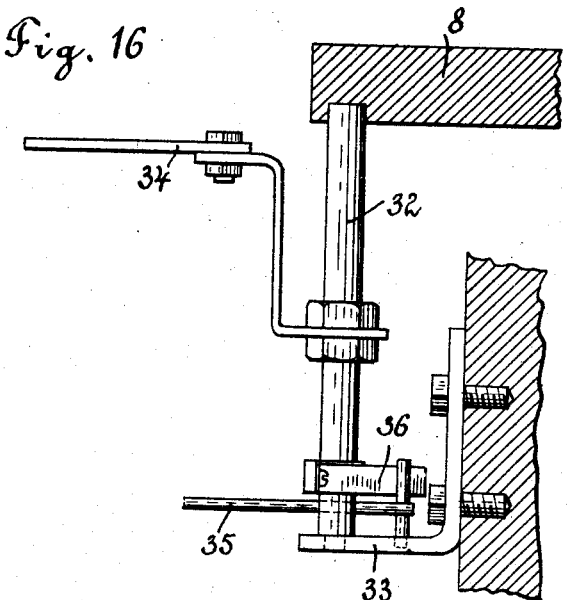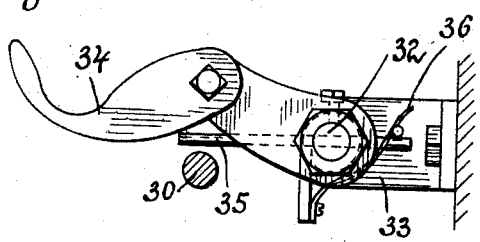

UNITED STATES PATENT OFFICE.

IGNAZIO DE FRANCISCI, OF NEW YORK, N. Y.

MACHINE FOR CONVEYING AND DISTRIBUTING BUTTON-BLANKS.

No. 901,893.    Specification of Letters Patent.    Patented Oct. 20, 1908.

Application filed December 11, 1906. Serial No. 347,316.

*To all whom it may concern:*

Be it known that I, IGNAZIO DE FRANCISCI, a subject of the King of Italy, and resident of the city of New York, in the county of New York and State of New York, have invented certain new and useful Improvements in Machines for Conveying and Distributing Button-Blanks, of which the following is a specification.

The invention refers to improvements in button machines and especially to apparatus for delivering button blanks or similar articles to special devices, whereon the blanks are worked upon in any suitable manner for the purpose of making finished buttons therefrom.

The new and useful features of the invention, forming the subject matter of the present application, comprise that part of a button machine, by means of which the blanks are removed from a storage table or container and conveyed to and distributed unto a receiving table, for the purpose hereinabove already specified. This distributing means comprises a pair of rotating members on a common shaft and situated in parallel planes and operated by means of a rotatable receiving disk. One of the members removes a blank from the exit of an inclined table and conveys the same through a conduit to a place where it slips upon a second table and within reach of the second member, and by this member is finally conveyed unto its proper place upon the receiving table.

Figure 1:
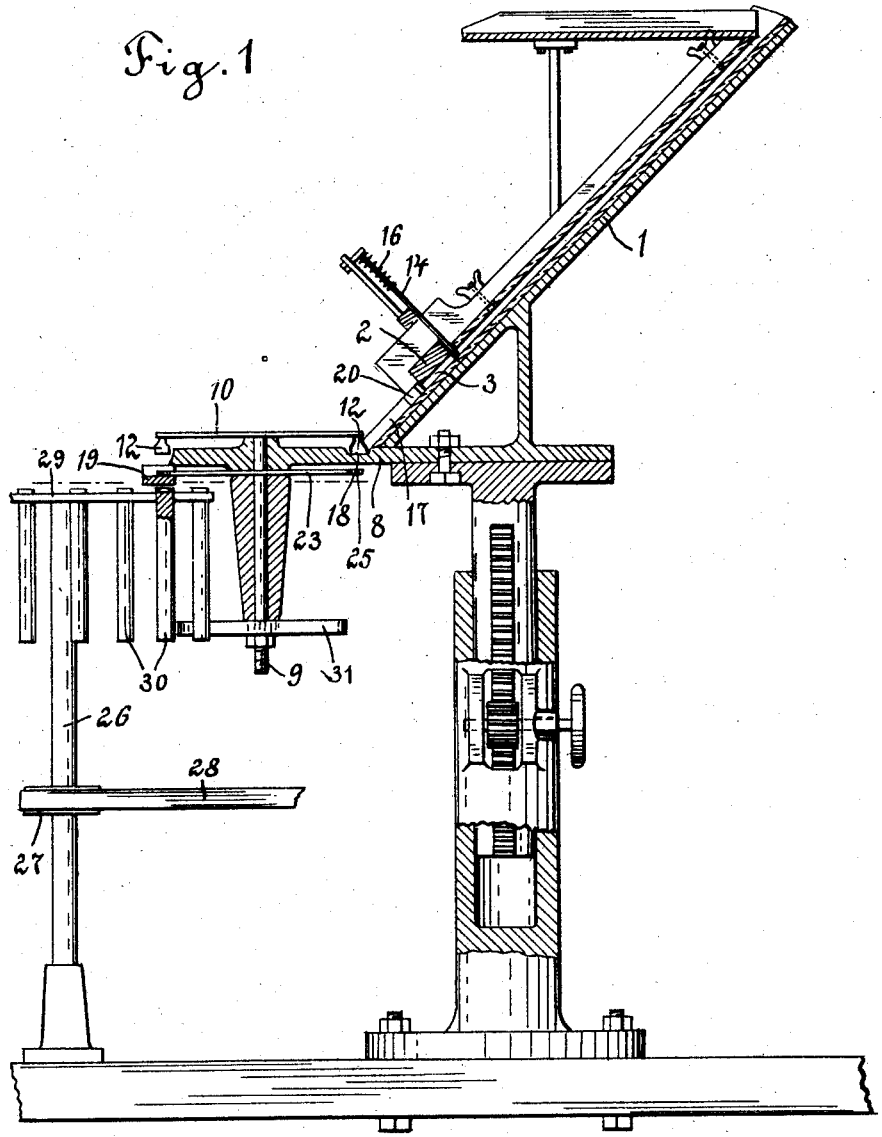
Figure 8:
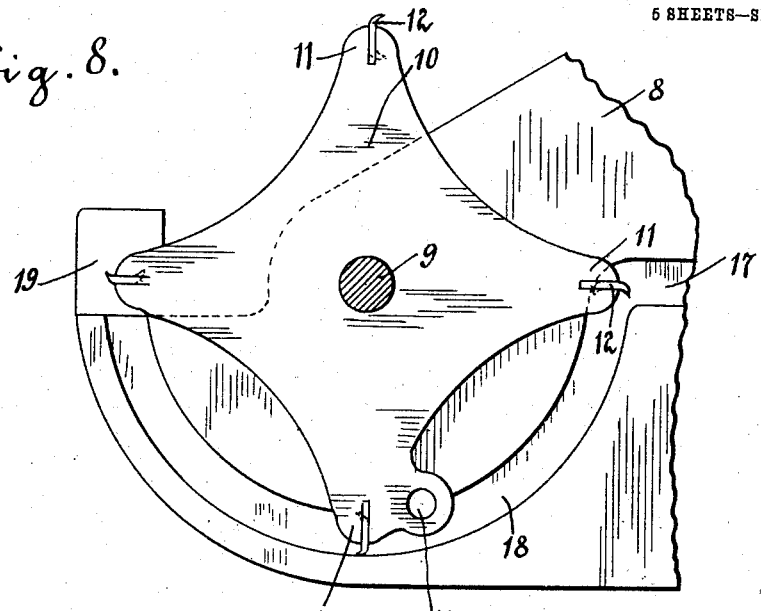
Figure 9:
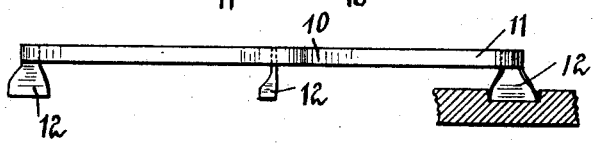
Figure 10:
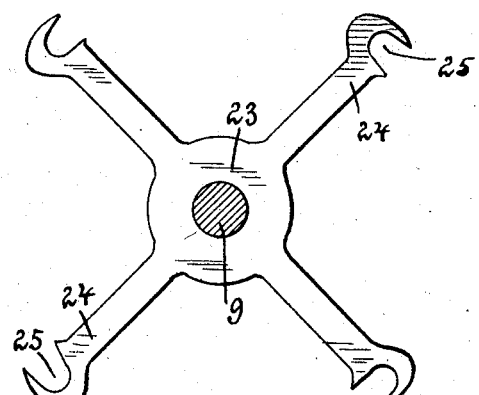

In the drawings Figure 1 shows a vertical section of the entire conveying part of a button machine, Fig. 2 a top view of the same, Figs. 3, 4, 5, 6 and 7 details of construction of the reciprocating receiving bar, Figs. 8, 9 and 10 details of construction of the rotating distributing members, Figs. 11, 12, 13 and 14 details of construction of an auxiliary device for the rotatable receiving table, and Figs. 15, 16 and 17 a modification of the distributing members.

The usual inclined table or chute 1 of a button machine is provided with a reciprocating bar 2 at the lower end thereof, as now well known in the art, and having passages 3, for receiving button blanks from the inclined table and passing the same to the distributing devices, hereinafter to be described. The reciprocating bar 2 is operated by means of a connection between the rotating parts of the delivery device and comprising a pivot 4 and a connecting rod 5, a guide bar 6 and guide brackets 7, whereby the rotary motion of the delivery devices causes a reciprocating motion of the bar 2.

The delivery devices are arranged on a horizontal table 8 and comprise a shaft 9 on that table, provided, in the first instance, with a disk 10, having a series of radial extensions 11, and at their ends receiving shovels 12. The operating bar 2 is pivoted at 13 to this disk 10.

Button blanks, located on the inclined table 1, enter into the passages 3 of the bar 2 and are then moved so that one of the same is placed in position to slide into the passage or conduit 17, leading to a semicircular path 18. In order to prevent the passing of a button into the passage 17 before the prior button has slid down the incline into the conduit 17, a closure is provided for that passage, comprising a movable bar 14, the movement of which is controlled by springs 15 and 16 in two directions. When a button has passed into the conduit 17 and within the reach of the shovels 12, it is taken hold of by one of the approaching receiving shovels 12, and moved along the semicircular path 18, until it slides off unto the platform 19.

Should it occur that one of the blanks is delayed in passing off from the passage 3 of the reciprocating bar 2 into the conduit 17, it may cause a serious obstruction of the movement of the reciprocating bar. In order to facilitate this passing off, the entrance to the conduit 17 is provided with movable members 20 on a pivot 21, and controlled by a spring 22, so that when a blank should enter the passage 17 only partly, the reciprocating bar 2 will push the blank against one of the movable members 20, whereby the blank is removed from the path of the reciprocating bar and slides down the passage 17, the movable member 20, being controlled by the spring 22, returns to its normal position.

Following further the travel of the blank, it will be seen that the blank located on the platform 19 is within the path of travel of the rotating member 23, which consists of a series of radial arms 24, having suitable recesses 25 at the ends thereof. The arms are set or placed about 45° in relation to the similar arms 11 of the rotating member 10 and engage the button blank for the purpose of removing it from the platform 19 unto the rotating receiving table 29, the rotation of which is so regulated that the button blank, held in the recess 25 of the arm 24, drops into the head of one of the chucks 30, whereby it gets out of range of the recess 25 and by the rotation of the table 29 may be delivered to any other part of the machine for further manipulation. The disk or table 29 is secured to a rotatable shaft 26, receiving its rotation by means of a pulley 27 and a driving belt 28, from any suitable source of power. The lower extensions of the chucks 30, at the same time, are instrumental in imparting rotation to the shaft 9, upon which the members 23 and 10 are secured. The direct means for this purpose comprises a cam-wheel 31, having surfaces coöperating with the chucks 30, so that, in the form of the machine illustrated in the drawings, each chuck causes a rotation of 90° of the shaft 9, and as the radial arms 11 of the member 10 and 24 of the member 23 are arranged at right angles to each other and the radial arms of the one member in relation to the similar arms of the other member set or placed at 45°, it will be seen that each chuck corresponds, in turn, to one radial arm on each of the rotatable members, and in course of the operation of the apparatus, an easy and efficient distribution of the button blanks unto the heads of the chucks takes place.

Figs. 12, 13 and 14 illustrate an auxiliary device for guiding the button blanks into the heads of the chucks 30, after they have been engaged by recess 25 of the radial arms 24. The device comprises an arm 37, adjustably secured to the table 8, and having bearings 38, for carrying a casing 39, provided with a rotatable roller 40 of considerable weight. A spring blade 41, preferably integral with the casing, presses upon the roller 40 and the apparatus is arranged in the way as shown in Fig. 11, so that a button dropped off the platform 19 and not finding its proper place in the head of one of the chucks 30, is guided into this place by the casing 39 and the roller 40, since this blank in the course of the rotation of the table 29 comes in the path of this casing and roller.

Figs. 15, 16 and 17 illustrate a modification of the delivery device for button blanks unto the chucks of the rotatable table 29. The rotating member 10 and its driving means are identical with the similar device, heretofore described. The means for removing the button blanks from the platform 19 unto the chucks 30 comprise an oscillating shaft 32, movably located in a bearing of the table 8 and a bracket 33, and provided with an operating arm 34, corresponding to the radial arms 24 and the recess 25 of the rotating member 23, heretofore described. The shaft 32 is oscillated by means of a rod 35, located with one end in the path of the rotation of the lower extensions of the chucks 30 and capable of being pushed aside by each of the chucks, causing the arm 34 to engage a button blank on the platform 19 and push it off unto the table 29, while the return of the arm 34 and its shaft 32 to normal position is brought about by the spring 36, fastened to the shaft 32.

The advantages of the present apparatus consist in a very simple way of engaging the button blank sliding off the inclined delivery table and arranging the same in successive order, and finally delivering the same to the operating means of the machine without the use of complicated apparatus, such as pneumatic devices, heretofore in use.

As new and useful is claimed and desired to be secured by Letters Patent of the United States—

1. In a button machine, the combination with an inclined table capable of delivering button blanks, of a horizontal table having a conduit, a support, said conduit leading from said inclined table to said support, a rotatable shaft, a conveyer on said shaft and adapted to receive said blanks from the said inclined table and convey same along said conduit and deliver them to said support, a receiving table, a second conveyer on said shaft located in a plane parallel to the plane of and beneath said first conveyer and above the plane of said support and adapted to engage said blanks on said support and convey them to said receiving table.

2. In a button machine, the combination with an inclined table capable of delivering button blanks, of a horizontal table having a conduit, a support, said conduit leading from said inclined table to said support, a rotatable shaft, a conveyer on said shaft and adapted to receive said blanks from the said inclined table and convey same along said conduit and deliver them to said support, a receiving table at the base of said inclined table, a second conveyer on said shaft located in a plane parallel to the plane of and beneath said first conveyer and above the plane of said support and adapted to engage said blanks on said support and convey them to said receiving table.

Signed at New York, in the county of New York and State of New York, this 8th day of November, A. D. 1906.

IGNAZIO DE FRANCISCI.

Witnesses:
 FRANK DECLARA,
 SIGMUND HERZOG.